Dec. 28, 1965  KARL-HEINZ WÖHNER  3,225,673
PHOTOGRAPHIC OBJECTIVE
Filed Dec. 5, 1963  2 Sheets-Sheet 1
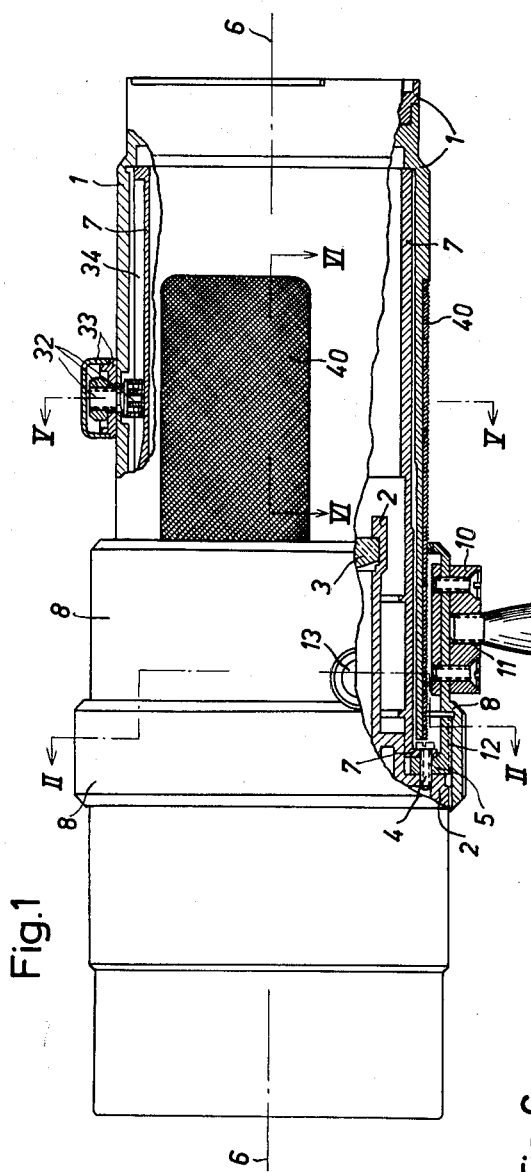
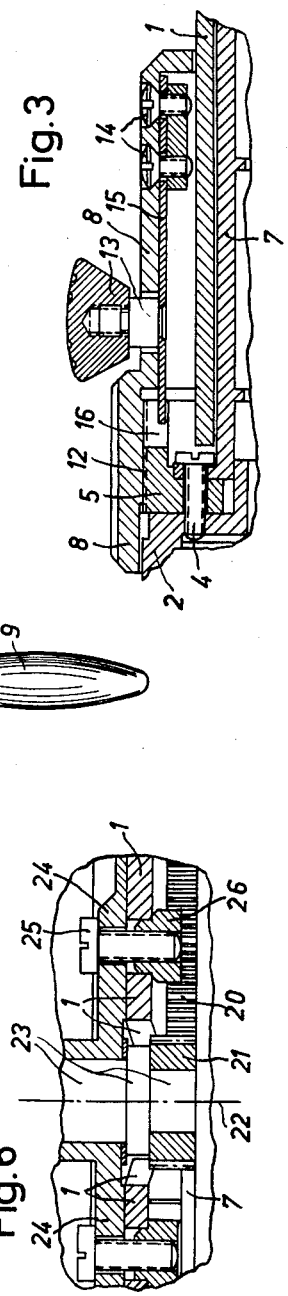
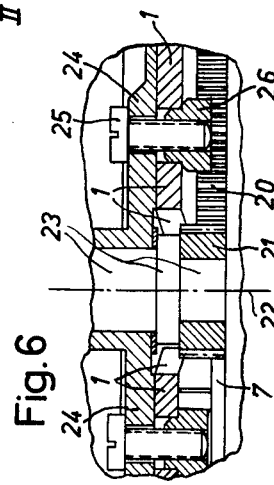

United States Patent Office 3,225,673
Patented Dec. 28, 1965

3,225,673
PHOTOGRAPHIC OBJECTIVE
Karl-Heinz Wöhner, Oberkochen, Wurttemberg, Germany, assignor to Carl Zeiss-Stiftung, doing business as Carl Zeiss, Heidenheim (Brenz), Wurttemberg, Germany, a foundation established under the laws of Germany
Filed Dec. 5, 1963, Ser. No. 328,383
Claims priority, application Germany, Dec. 7, 1962,
Z 9,807
8 Claims. (Cl. 95—45)

The invention relates to improvements in a photographic objective provided with a built-in adjusting device and in particular relates to a photographic objective having a great focal length and which is intended for mirror reflex cameras.

Photographic objectives of this type are known which comprise in principle a tubular member which is fixedly attachable to a camera, a mount which carries the lens system, and a diaphragm mechanism and sometimes also the shutter mechanism. The focussing of such an objective to a predetermined distance is accomplished by rotating a distance adjusting ring which is arranged on the objective and is rotatable about an angle of 180° or more. This ring is usually operatively connected with the objective mount by means of an adjusting thread in such a manner that upon rotation of this ring about the axis of the objective a slidable adjustment of the objective takes place along the optical axis.

It is an object of the invention to provide a photographic objective which permits a very quick adjustment, particularly a focussing adjustment.

In accordance with the invention the photographic objective, particularly one having a great focal length, and being provided with a built-in adjusting device and intended for mirror reflex cameras, and in which the objective mount is connected with a cylindrical member which is axially slidably mounted without play in a tubular member attached to the camera, is characterized by a handle on said cylindrical member. Said handle is releasably attached to said cylindrical member so that the hand which holds the handle may press with its thumb against the tubular member in order that the cylindrical member may be easily axially moved in the tubular member attached to the camera by an axial movement of the thumb which presses against the tubular member, whereby an axial movement of the objective mount connected with the cylindrical member takes place.

In the photographic objective of the present invention the focussing is no longer performed, as in photographic objectives of the prior art, by seizing and rotating a distance adjustment ring or by slidably moving a cylindrical member parallel to the optical axis relative to a tubular member attached to the camera, but the present invention performs a focussing merely by pressing the thumb of the hand holding a handle attached to a cylindrical member against the circumference of a tubular member and then performing with said thumb a relative movement between the tubular member and the cylindrical member, whereby very quickly a focussing of the objective takes place while the camera remains in front of the eye of the camera user and permits the latter to continuously observe the viewfinder image.

According to another object of the invention, the cylindrical member which carries the objective mount is provided with a toothed rack which extends parallel to the optical axis, and this toothed rack is in engagement with a pinion which is rotatably mounted on the tubular member which is attachable to the camera.

According to still another object of the invention, the shaft on which the pinion is mounted is also connected with the distance adjusting ring of the photographic objective and this distance adjusting ring moves axially with the cylindrical member when the latter moves relatively to the tubular member. Furthermore, the adjusted distance is readable on a scale provided on the distance adjusting ring and also the depth of focus range may be read on a scale arranged on a fixed part adjacent said distance scale.

Furthermore, the invention provides that upon rotation of the distance adjusting ring the cylindrical member which carries the objective mount is moved relatively to the tubular member which is attachable to the camera. The focussing by means of the distance adjusting ring is generally to be preferred when the releasable handle is replaced by a tripod.

Another object of the invention resides in the arrangement of a clamping device which preferably is operatively connected with the shaft which carries the pinion or which also may be operatively connected with the distance adjusting ring. This clamping device has the purpose of adjusting the degree of ease or difficulty with which the axial slidable movement between the tubular member and the cylindrical member takes place. This clamping device may also be used, after the focussing has been accomplished, for arresting any further relative movement between the cylindrical member and the tubular member. This clamping device is particularly helpful when the camera during picture taking is tilted at an angle.

Still another object of the invention is to obtain in addition to the quick focussing of the photographic objective also a quick change of the position of the camera from taking vertical pictures to taking horizontal ones. For this purpose the cylindrical member carries in accordance with the invention a ring which moves axially with the cylindrical member and which surrounds the tubular member and is provided with means for securing thereon the handle or a nut member which latter may be attached to a tripod. This ring is rotatable with the handle or with the nut member relatively to the remaining parts of the objective, including the camera, about the tubular member. Preferably, this ring cooperates with a releasable key which may easily be actuated by the thumb of the hand holding the handle. This key is adapted to lock the ring in two positions which are 90° spaced from one another and which correspond to the camera positions for vertical and horizontal pictures, respectively.

Other objects and advantages of the invention will be described in the following description with reference to the accompanying drawings which by way of example illustrate one embodiment of the photographic objective according to the invention.

In the drawings:

FIG. 1 is a side elevation view of the photographic objective of the invention, illustrated partly in a longitudinal section with parts of the diaphragm mechanism omitted for the sake of clearness.

FIG. 3 is a longitudinal sectional view along the line III—III of FIG. 2 in an enlarged scale.

FIG. 6 is a longitudinal sectional view along the line VI—VI of FIG. 1 in an enlarged scale.

Referring to the FIGS. 2, 3, 5 and 6, it should be noted that for the sake of clearness the diaphragm and shutter parts within the tubular members have been omitted.

Figure 2:
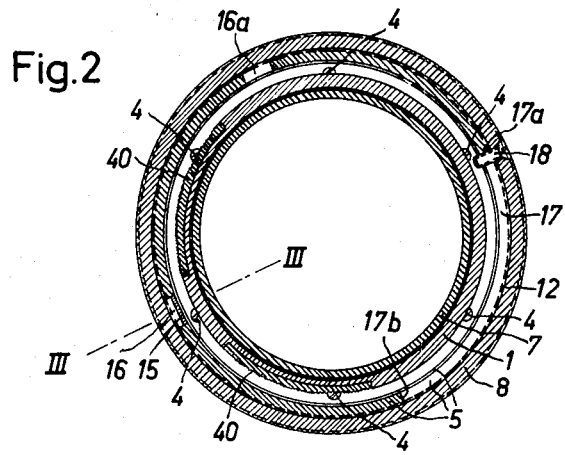
FIG. 2 is a cross sectional view along the broken line II—II of FIG. 1.

Referring to the FIGS. 1 to 3, the photographic objective is provided with a tubular member 1 adapted to be attached to a camera and with an objective mount 2 in which is mounted the lens system 3 and a not illustrated diaphragm mechanism and, if desired, also a shutter mechanism. The objective mount 2 is attached by screws 4 to an intermediate annular member 5 and by the same screws 4 also to one end of a cylindrical member 7 which latter is axially slidably mounted without play in the tubular member 1. On the end of the tubular member 1 which faces the objective mount 2 is mounted without play a ring 8 which is axially slidable and rotatable on the tubular member 1. This ring 8 carries a block 10 to which may be attached a handle 9 or a tripod. In the illustrated embodiment of the invention this block 10 comprises a tripod nut, the thread 11 of which may be used for the attachment of the handle 9 or the tripod thereto. Furthermore, the ring 8 is connected with the objective mount 2 and the cylindrical member 7 by a thread 12 which is arranged on the intermediate annular member 5 in such a manner that the ring 8 is relatively rotatable to the objective mount 2 and the cylindrical member 7, whereby however both these parts 2 and 7 are moved in axial direction when the ring 8 is moved in axial direction of the photographic objective. For the purpose of adjusting the distance of the objective it is therefore only necessary to axially displace the ring 8 because such a movement effects an axial adjustment of the objective mount 2 and of the cylindrical member 7 while the ring 8 itself slides along the tubular member 1.

Since the ring 8 is rotatable about the tubular member 1, it is also possible to adjust the camera quickly for horizontal and vertical pictures, and vice versa. For this purpose the ring 8 is adapted to be locked in two positions which are displaced 90° from one another by a pressure key 13 and these two positions correspond to the camera positions for vertical and horizontal pictures, respectively.

In the preferred embodiment of the invention, the key 13 is attached to a spring-like locking lever 15, one end of which is secured by rivets 14 or the like on the inner wall of the ring 8. The other free end of this locking lever 15 is adapted to engage selectively two recesses 16 and 16a arranged at 90° spaced from each other in the exterior edge of the thread 12 on the intermediate annular member 5 between the objective mount 2 and the cylindrical member 7.

In order to release the locking lever 15 from either one of the two recesses 16 or 16a, it is only required to depress the key 13. Preferably, this key 13 is arranged in such a position that it may be actuated by the thumb of the hand holding the handle 9. FIG. 2 shows that the intermediate annular member 5 is also provided with a groove 17 which extends circumferentially a distance somewhat in excess of 90°. The end walls 17a and 17b of this groove 17 are adapted to be engaged by a screw 18 mounted on the ring 8 so that the permissive angle of rotation of the ring 8 and therewith the one of the intermediate annular member 5 is limited to substantially 90°.

Figure 4:
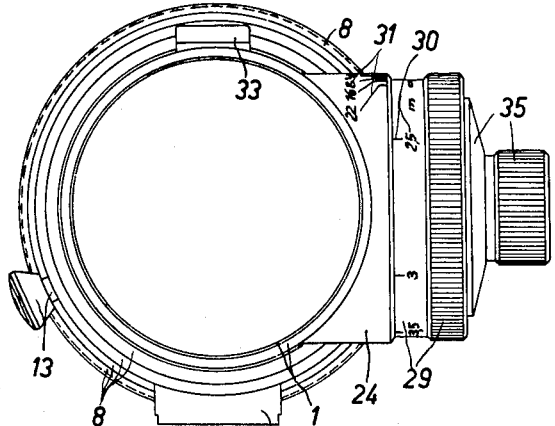
FIG. 4 is an end view of the photographic objective taken from the end where the camera is attached, whereby certain parts within the tubular members are omitted. The handle which is shown in FIG. 1 is also omitted.
Figure 5:
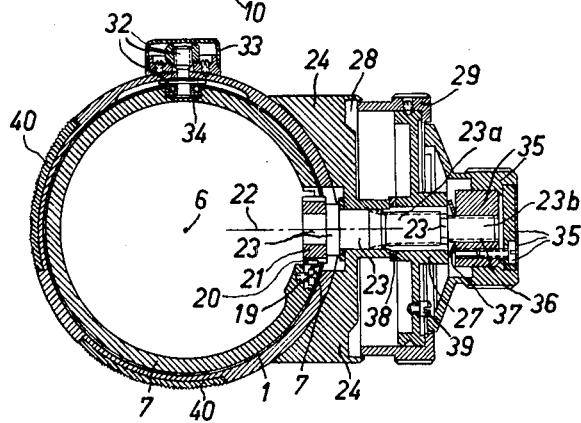
FIG. 5 is a cross sectional view along the line V—V of FIG. 1.

Referring now to FIGS. 5 and 6, the same show that the inner cylindrical member 7 has attached thereto by means of a screw 19 (FIG. 5) a rack bar 20 which extends parallel to the optical axis 6 (FIG. 1) of the objective. This rack bar 20 is engaged by a pinion 21 whose axis of rotation 22 extends at a right angle to the optical axis 6. The pinion 21 is attached to a shaft 23 which is rotatably supported in a lateral member 24 attached by screws 25 and nuts 26 (FIG. 6) to the tubular member 1. The center portion 23a of the shaft 23 is constructed as a wedge member upon which an intermediate member 27 is mounted. The latter carries a distance adjusting ring 29 which projects into an annular recess 28 in the lateral member 24. This distance adjusting ring 29 is not only rotatable with the shaft 23 but is also slidable on the shaft 23. As a result of the connection comprising the cylindrical member 7, the toothed rack 20, the pinion 21, the shaft 23, the intermediate member 27 and the distance adjusting ring 29 an axial displacement between the tubular member 1 and the cylindrical member 7 causes a rotation of the distance adjusting ring 29 and vice versa. The adjusted distance and the depth of focus range can be read off on the distance scale 30 provided on the ring 29 and on the depth of focus range scale 31 on the lateral member 24, respectively (FIG. 4).

In accordance with FIGS. 1 and 5, the invention provides in addition to the rack bar 20 and the pinion 21 a guiding device for the cylindrical member 7 in the tubular member 1. This additional rectilinear guiding device comprises a groove 34 which extends parallel to the optical axis in the outer surface of the cylindrical member 7, and a ball bearing 32 which is mounted on the tubular sleeve 1 and is covered by a cap 33. This ball bearing 32 engages the groove 34 with very little play and does not impair the ease of sliding of the cylindrical member 7 relative to the tubular member 1 as a simple guide pin would do.

The invention provides also a novel clamping device for adjusting the degree of ease or difficulty with which the slidable movement between the tubular member 1 and the cylindrical member 7 and the clamping together of these two parts is accomplished when the photographic objective has been adjusted to the desired distance. This clamping device is particularly useful when the camera is held in an inclined position while taking a picture. This clamping device is particularly clearly illustrated in the FIGS. 4 and 5 and as a whole is represented by an adjusting knob 35. This knob 35 is connected by a thread 36 with the outer end portion 23b of the shaft 23. When the knob 35 is rotated in one direction and at the same time the cylindrical member 7 and the tubular member 1 are held securely against relative movement, an annular disc spring 37 positioned between the knob 35 and the intermediate member 27 is pressed against one end of said intermediate member 27 so that the latter in turn is moved along the wedge portion 23a of the shaft 23 toward the lateral member 24. A friction ring 38 is arranged between the lateral member 24 and the intermediate member 27 and when the pressure of the intermediate member 27 upon the ring 38 increases, the distance adjusting ring is clamped in position more and more and the slidable movement between the tubular member 1 and the cylindrical member 7 becomes gradually more difficult. Upon rotation of the knob 35 into the opposite direction, however, the force of this clamping action of the distance adjusting ring 29 is gradually relieved. A screw 39 in the intermediate member 27 acts to limit the angle of rotation of the knob 35.

The photographic objective of the invention operates in the following manner:

The camera will be held in the right hand of the photographer and the handle 9 which is attached to the tripod nut 10 is held by the left hand of the photographer. In order to give the thumb of the left hand a good hold on the circumference of the tubular member 1 so that the thumb may effect a relative axial displacement of the tubular member 1 with respect to the cylindrical member 7 and in order to support the weight of the camera including the objective, the tubular member 1 is provided on its circumference with two inserts 40 of friction type material which are spaced from each other at an angle of 90° and correspond to the positions of the thumb when the camera is used for vertical and horizontal pictures, respectively.

For a quick focussing the thumb of the left hand which engages one of the two inserts 40 is moved in such a manner that the tubular member 1 on the camera moves relatively to the handle 9 which is connected with the objective mount 2 and the cylindrical member 7. This axial displacement is carried so far until the object to be photographed appears sharply defined in the viewfinder of the mirror reflex camera. Thereupon the knob 35 may be operated while the thumb still presses against the insert 40, so that the cylindrical member 7 is arrested or locked in its adjusted position relative to the tubular member 1. During the focussing the upper left arm of the camera user remains in engagement with his chest.

When a tripod is used in place of the handle 9, the focussing operation is preferably made by rotating the distance adjusting ring 29 which for this purpose is knurled along its outer circumference.

If it is desired to change from horizontal pictures to vertical ones, the left hand thumb is moved away from the insert 40 and is now used to depress the key 13. This has the result that the locking lever 15 is moved away from the recess 16 or 16a, respectively, so that the ring 8 becomes unlocked. Now the camera with the entire objective may be rotatably adjusted by the right hand of the camera user relative to the handle 9 or the tripod by being rotated relatively to the ring 8 until the locking lever 15 engages the other recess 16a or 16, respectively, and when this has been done, the camera has been rotated about an angle of 90° without having removed the left hand from the handle 9. After this rotative adjustment of the camera the second insert 40 has moved into the same position in which the other insert 40 was relative to the handle 9 so that now the already described focussing operation can be performed in exactly the same manner.

The photographic objective of the invention permits therefore in connection with a camera and a handle a quick focussing and still the entire camera is safely held in position. Furthermore, a quick change from horizontal pictures to vertical pictures and vice versa may be accomplished without removing the hand from the handle.

What I claim is:

1. A photographic objective with a built-in adjusting device comprising an objective mount 2 connected with a cylindrical member 7, a tubular member 1 for fixed attachment to a camera, means for mounting said cylindrical member for axial movement without play in said tubular member, a ring 8 on said cylindrical member 7 arranged to move axially with the same and surrounding said tubular member 1, a tripod nut fixedly attached to said ring, a handle releasably attached to said tripod nut in such a manner that the thumb of the hand holding said handle is able to press against said tubular member so as to easily move said cylindrical member axially relative to said tubular member which is fixedly attachable to said camera, whereby during the movement of said thumb in axial direction of said tubular member an axial movement of said tubular member relative to the handle and the cylindrical member and the objective mount connected to the latter takes place.

2. A photographic objective with a built-in adjusting device comprising an objective mount 2 connected with a cylindrical member 7, a tubular member 1 for fixed attachment to a camera, means for mounting said cylindrical member for axial movement without play in said tubular member, a ring 8 on said cylindrical member 7 arranged to move axially with the same and surrounding said tubular member 1, a tripod nut fixedly attached to said ring, a handle releasably attached to said tripod nct in such a manner that the thumb of the hand holding said handle is able to press against said tubular member so as to easily move said cylindrical member axially relative to said tubular member which is fixedly attachable to said camera, whereby during the movement of said thumb in axial direction of said tubular member an axial movement of said tubular member relative to the handle and the cylindrical member and the objective mount connected to the latter takes place, a toothed rack being attached to said cylindrical member so as to extend parallel to the axis thereof, a pinion meshing with said toothed rack, said pinion being fixedly mounted on a shaft rotatably supported on said tubular member, and a distance adjusting ring being mounted on said shaft.

3. A photographic objective according to claim 2, and including an adjustable clamping device and means for operatively connecting the same with said shaft for adjusting the degree of ease with which the relative axial sliding movement takes place between said tubular member and said cylindrical member.

4. A photographic objective according to claim 2, and including an adjustable clamping device and means for operatively connecting the same with said distance adjusting ring for adjusting the degree of ease with which the relative axial sliding movement takes place between said tubular member and said cylindrical member.

5. A photographic objective with a built-in adjusting device comprising an objective mount 2 connected with a cylindrical member 7, a tubular member 1 for fixed attachment to a camera, means for mounting said cylindrical member for axial movement without play in said tubular member, a handle releasably attached to said cylindrical member in such a manner that the thumb of the hand holding said handle is able to press against said tubular member so as to easily move said cylindrical member axially relative to said tubular member which is fixedly attachable to said camera, whereby during the movement of said thumb in axial direction of said tubular member an axial movement of said tubular member relative to the handle and the cylindrical member and the objective mount connected to the latter takes place, and a ring 8 on said cylindrical member 7 arranged to move axially with the latter, said ring surrounding said tubular member 1 and having said handle 9 attached thereto, and means for permitting said ring with its associated member, such as said handle, and said cylindrical member 7 and said objective mount 2 to be rotated relative to said tubular member 1 and said camera.

6. A photographic objective according to claim 5, including a manually operable locking device 13, 15 for arresting said ring 8 selectively into two positions which are 90° spaced from each other, said two positions corresponding to horizontal and vertical pictures respectively, to be produced in the camera.

7. A photographic objective according to claim 5, including a manually operable locking device 13, 15 for arresting said ring 8 selectively into two positions which are 90° spaced from each other, said two positions corresponding to horizontal and vertical pictures respectively, to be produced in the camera, said tubular member being provided on its outer circumference with two rough surface areas which are spaced 90° from one another and are adapted to be engaged selectively by the thumb of the hand which holds the handle.

8. A photographic objective with a built-in adjusting device comprising an objective mount 2 connected with a cylindrical member 7, a tubular member 1 for fixed attachment to a camera, means for mounting said cylindrical member for axial movement without play in said tubular member, a ring 8 on said cylindrical member 7 arranged to move axially with the same and surrounding said tubular member 1, a tripod nut fixedly attached to said ring, a handle releasably attached to said tripod nut in such a manner that the thumb of the hand holding said handle is able to press against said tubular member so as to easily move said cylindrical member axially relative to said tubular member which is fixedly attachable to said camera, whereby during the movement of said thumb in axial direction of said tubular member an axial movement of said tubular member relative to the handle and the cylindrical member and the objective mount connected to the latter takes place, and means for assuring a rectilinear movement of said cylindrical member relative to said tubular member, said means comprising a groove arranged in one of said members and extending parallel to the optical axis of said objective and a ball bearing mounted on the other one of said members to be rotatable about an axis at right angles to said optical axis so that the outer race of said ball bearings extends into said groove and engage the side walls of the same.

References Cited by the Examiner

UNITED STATES PATENTS

| | | | |
|---|---|---|---|
| 1,820,484 | 8/1931 | Owens | 95—45 |
| 2,831,413 | 4/1958 | Reiche | 95—45 |
| 2,938,444 | 5/1960 | Kellner | 95—45 |
| 2,984,167 | 5/1961 | Staubach | 95—45 |

FOREIGN PATENTS 282,447   8/1952   Switzerland.

JOHN M. HORAN, *Primary Examiner.*